US012656285B2

(12) United States Patent
Shen et al.

(10) Patent No.: US 12,656,285 B2
(45) Date of Patent: Jun. 16, 2026

(54) APPARATUS FOR MEASURING THERMAL DIFFUSION COEFFICIENT OF MATERIAL

(71) Applicant: Anhui Luxet Infrared Technology Co., Ltd, Hefei (CN)

(72) Inventors: Jinhui Shen, Hefei (CN); Xiangan Liu, Hefei (CN)

(73) Assignee: Anhui Luxet Infrared Technology Co., Ltd, Hefei (CN)

( * ) Notice: Subject to any disclaimer, the term of this patent is extended or adjusted under 35 U.S.C. 154(b) by 0 days.

(21) Appl. No.: 19/457,274

(22) Filed: Jan. 23, 2026

(65) Prior Publication Data

US 2026/0153462 A1     Jun. 4, 2026

(51) Int. Cl.
*G01N 25/18*          (2006.01)
(52) U.S. Cl.
CPC .................................... *G01N 25/18* (2013.01)
(58) Field of Classification Search
CPC ...................................................... G01N 25/18
USPC .................................... 374/43, 44, 141, 121
See application file for complete search history.

(56) References Cited

U.S. PATENT DOCUMENTS

| | | | | |
|---|---|---|---|---|
| 5,688,049 | A * | 11/1997 | Govorkov | G01N 25/18 |
| | | | | 374/44 |
| 6,273,603 | B1 * | 8/2001 | Cheindline | G01N 25/18 |
| | | | | 374/124 |
| 2015/0177168 | A1 | 6/2015 | Lee et al. | |
| 2016/0011130 | A1 | 1/2016 | Lee et al. | |
| 2017/0131193 | A1 | 5/2017 | Yamamoto et al. | |
| 2022/0276188 | A1 * | 9/2022 | Rettenmayr | G01N 25/20 |

FOREIGN PATENT DOCUMENTS

| | | | | | |
|---|---|---|---|---|---|
| CN | 111060555 | A | * | 4/2020 | G01N 25/20 |

* cited by examiner

*Primary Examiner* — Mirellys Jagan
(74) *Attorney, Agent, or Firm* — Hemisphere Law, PLLC

(57) ABSTRACT

An apparatus for measuring a thermal diffusion coefficient of a material is provided, including a base, and a modulated laser module, a beam shaping and focusing module, and a drive module that are fastened to the base. A vacuum sample chamber module is disposed above the beam shaping and focusing module. An infrared camera module that is able to move up and down freely is disposed above the vacuum sample chamber module. The drive module is configured to drive the infrared camera module to move up and down freely. The modulated laser module emits a laser beam to the beam shaping and focusing module. The beam shaping and focusing module guides the laser beam into the vacuum sample chamber module to irradiate the material. The infrared camera module collects thermal sequence images after the material is heated.

16 Claims, 5 Drawing Sheets

APPARATUS FOR MEASURING THERMAL DIFFUSION COEFFICIENT OF MATERIAL

TECHNICAL FIELD

The present disclosure relates to the field of material performance measurement, in particular to an apparatus for measuring a thermal diffusion coefficient of a material.

BACKGROUND

Limited by measurement devices and calculation models, the prior art mainly focuses on studying thermal physics and thermal transmission of millimeter-sized materials. When a material thickness decreases to be micron-sized, a most traditional and most commonly used laser flash analyzer cannot accurately represent thermal physical properties of the millimeter-sized material. A laser flash method, that is, an LFA (Laser Flash Analysis) method, calculates a thermal diffusion coefficient of a material by using a relationship between a temperature rise and time. However, a thin-film material is very thin in thickness and extremely short in heat transmission time, a sampling frequency and temperature measurement precision of an infrared detector are limited, and a heat transfer process cannot be effectively captured, so that the measurement reliability is greatly reduced.

Currently, the thin-film material is widely used in fields such as new energy sources and chip heat dissipation to implement special functions of an industrial component, and it is extremely important to master thermal physical properties of the thin-film material. A known micron thin-film thermal conductivity test system uses an infrared single-point detector. A thermal diffusion coefficient of a sample can be measured only at a specific location, and multiple locations of the sample can be detected only by means of displacement of a detection apparatus. In addition, the thermal diffusion coefficient of the micrometer-sized thin-film material cannot be measured and is inaccurate in measurement.

SUMMARY

To solve the foregoing technical problem, the present disclosure provides an apparatus for measuring a thermal diffusion coefficient of a material, so as to solve a technical problem that a thermal diffusion coefficient can be measured only at a single location.

The present disclosure provides an apparatus for measuring a thermal diffusion coefficient of a material, including a base, and a modulated laser module, a beam shaping and focusing module, and a drive module that are fastened to the base, where a vacuum sample chamber module is disposed above the beam shaping and focusing module, and an infrared camera module that is able to move up and down freely is disposed above the vacuum sample chamber module; the drive module is configured to drive the infrared camera module to move up and down freely; and the modulated laser module emits a laser beam to the beam shaping and focusing module, the beam shaping and focusing module guides the laser beam into the vacuum sample chamber module to irradiate the material, the infrared camera module collects thermal sequence images after the material is heated.

In an optional implementation, the drive module includes a motor and a moving module, and the motor drives the moving module so as to drive the infrared camera module to move up and down freely along a fixed route.

In an optional implementation, the moving module includes a drag chain and a sliding rail, the drag chain is connected to an upper part of the infrared camera module, and the sliding rail is configured to guide the infrared camera module.

In an optional implementation, the drive module further includes an operation rocker, and the operation rocker drives the moving module to move up and down freely by controlling the motor.

In an optional implementation, the infrared camera module includes an infrared host and an infrared microscope objective, the infrared microscope objective is detachably connected to the infrared host, and the infrared host is fixedly connected to the drive module by using a support frame.

In an optional implementation, the infrared microscope objective includes a lens switcher; and at least one infrared microscope objective is installed on the lens switcher.

In an optional implementation, the modulated laser module includes a laser and a power supply, and the infrared host is connected to the power supply.

In an optional implementation, the modulated laser module includes a laser device, a power supply, and a laser output coupled fiber, and the laser output coupled fiber is movably disposed on the base.

In an optional implementation, the vacuum sample chamber module includes a vacuum chamber and a support for supporting the vacuum chamber, the vacuum chamber is connected to a vacuum pump, the vacuum pump is configured to evacuate the vacuum chamber, and the support is erected on an outer side of the beam shaping and focusing module.

In an optional implementation, a germanium glass lens is covered above the vacuum chamber, and a quartz glass lens is disposed on a surface of the vacuum chamber facing the beam shaping and focusing module; and the vacuum chamber is a vacuum bellows.

In an optional implementation, a plurality of sample holders are disposed in the vacuum chamber. Optionally, the plurality of sample holders are configured to place the materials of different shapes.

In an optional implementation, the sample holders include single-hole sample holders or multiple-hole sample holders of different sizes.

In an optional implementation, the sample holder is made of a thermal insulation material and used for a high temperature environment, or the sample holder is made of a metal material and used for a room temperature environment.

In an optional implementation, the beam shaping and focusing module includes a beam expander, a right-angle reflecting prism, and a convex lens, where the convex lens is movably disposed above the beam expander and the right-angle reflecting prism.

In an optional implementation, the beam shaping and focusing module further includes an optical connecting rod fixedly connected to the convex lens, and a Z-axis displacement table, and the Z-axis displacement table is connected to the convex lens by using the optical connecting rod; and the convex lens is connected to the right-angle reflecting prism in a same optical path by using a coaxial connecting rod.

In an optional implementation, the apparatus for measuring a thermal diffusion coefficient of a material further includes an analysis module, where the infrared camera module includes an infrared host, the analysis module is connected to the infrared host, and the analysis module is configured to calculate the thermal diffusion coefficient of the material based on the thermal sequence images.

In an optional implementation, the infrared host is a plane array infrared detector.

In the present disclosure, the drive module is configured to drive the infrared camera module to move up and down freely, the infrared camera module that can move up and down freely may collect a surface image of a material in the vacuum sample chamber module, and a distribution image of a thermal diffusion coefficient on a surface of a sample may be obtained by means of one measurement.

Figure 1:
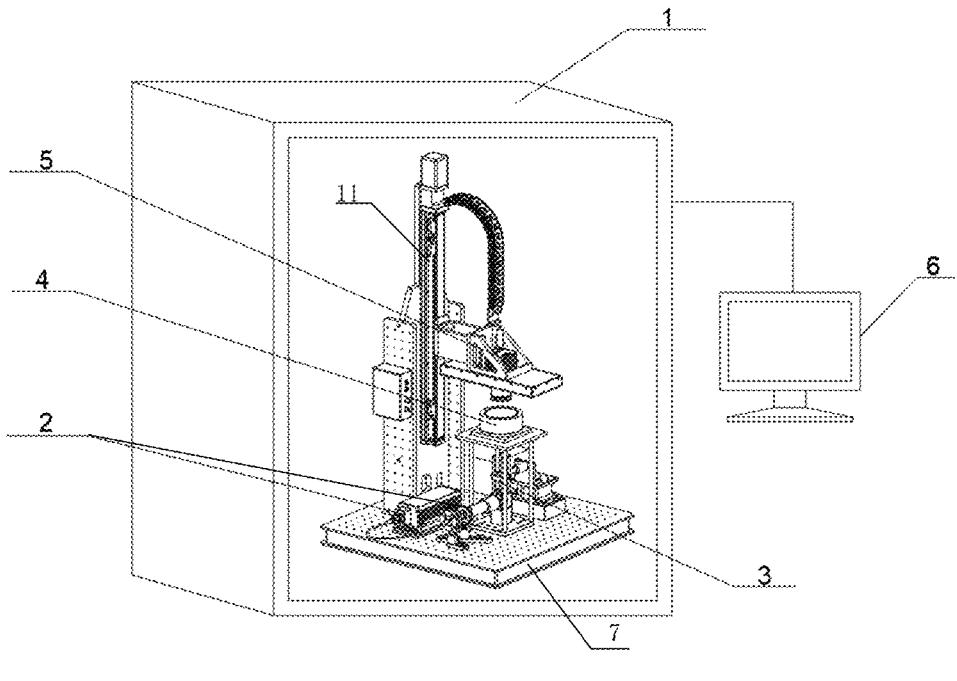
FIG. 1 is a structure diagram of an apparatus for measuring a thermal diffusion coefficient of a material in an embodiment of the present disclosure.

Reference numerals in accompanying drawings:

1: fastened frame; 2: modulated laser module; 3: beam shaping and focusing module; 4: vacuum sample chamber module; 5: infrared camera module; 6: analysis module; 7: base; 8: fastening hole; 9: infrared host; 10: infrared microscope objective; 11: moving module; 12: drag chain; 13: sliding rail; 14: support frame; 15: sample holder; 16: laser output coupled fiber; 17: coaxial connecting rod; 18: convex lens; 19: right-angle reflecting prism; 20: optical connecting rod; 21: Z-axis displacement table; 22: adjusting knob; 23: laser device; and 24: lens switcher.

DETAILED DESCRIPTION OF THE EMBODIMENTS

The following clearly and completely describes technical solutions in embodiments of the present disclosure with reference to drawings in the embodiments of the present disclosure. Apparently, the described embodiments are merely a part rather than all of the embodiments of the present disclosure. All other embodiments obtained by those skilled in the art on the basis of the embodiments of the present disclosure without requiring the exercise of inventive effort fall within the scope of protection of the present disclosure.

It needs to be illustrated that the following embodiments can be combined with each other under the compatible condition.

Figure 2:
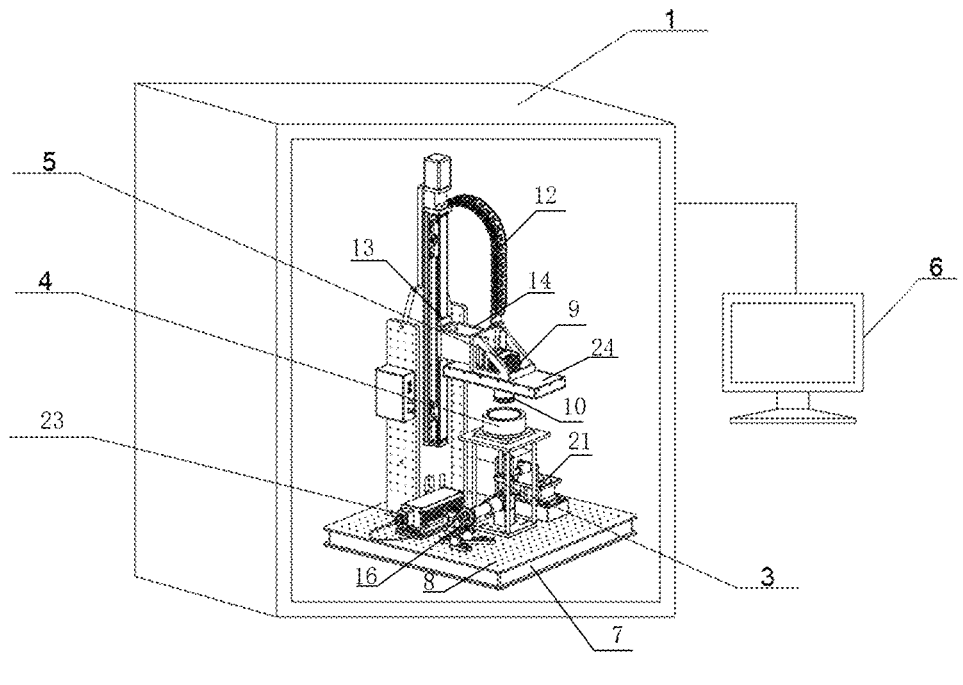
FIG. 2 is a structure diagram of an apparatus for measuring a thermal diffusion coefficient of a material in another embodiment of the present disclosure.

Referring to FIG. 1 and FIG. 2, the present disclosure provides an apparatus for measuring a thermal diffusion coefficient of a material, including a base 7, a modulated laser module 2, a beam shaping and focusing module 3, a drive module, a vacuum sample chamber module 4, an infrared camera module 5, and an analysis module 6. The modulated laser module 2, the beam shaping and focusing module 3, and the drive module are fastened to the base 7, and the infrared camera module 5 is fastened to the drive module. In the embodiment shown in FIG. 1, fastening holes 8 arranged in an array are disposed on the base 7, so as to fasten the foregoing modules.

The modulated laser module 2 is configured to generate a laser that periodically heats a to-be-measured material, thereby periodically heating the to-be-measured material (hereinafter, a thin-film material is taken as an example for illustration) at different laser pulse frequencies. The beam shaping and focusing module 3 is configured to optimize quality of a modulated laser spot and generate a laser-focused spot of a proper size on a back of a sample. The vacuum sample chamber module 4 is configured to install and fasten the measured material. The infrared camera module 5 is configured to record transient temperature distribution on a front side of the to-be-measured material to obtain a group of thermal image sequences. The modulated laser module 2 emits a laser beam to the beam shaping and focusing module 3. The beam shaping and focusing module 3 guides the laser beam into the vacuum sample chamber module 4 to irradiate the material. The infrared camera module 5 collects the thermal sequence images after the material is heated.

As shown in FIG. 1, the vacuum sample chamber module 4 is disposed above the beam shaping and focusing module 3. The infrared camera module 5 that is able to move up and down freely is disposed above the vacuum sample chamber module 4. The beam shaping and focusing module 3 is located below the vacuum sample chamber module 4. The modulated laser module 2 is located on one side of the beam shaping and focusing module 3 and can emit a laser beam to the beam shaping and focusing module 3. The above-mentioned modules are located on a same optical path.

The infrared camera module 5 includes an infrared host 9 and an infrared microscope objective 10, and the drive module includes a motor (not shown) and a moving module 11. The drive module is configured to drive the infrared camera module 5 to move up and down freely, so that the measured material is located on a focal plane of the infrared camera module 5 (a focal plane of the infrared host 9), so that the infrared host 9 can obtain a clear infrared image.

In some embodiments, the motor drives the moving module 11 so as to drive the infrared camera module 5 to move up and down freely along a fixed route. In the embodiment shown in FIG. 1, the moving module 11 includes a drag chain 12 and a sliding rail 13, the drag chain 12 is connected to an upper part of the infrared camera module 5, and the sliding rail 13 is configured to guide the infrared camera module 5. The drag chain 12 may be controlled to move up and down by means of rolling back and forth, and the sliding rail 13 may keep the infrared camera module 5 in a same position to move up and down, so as to ensure that the infrared camera module 5 and the vacuum sample chamber module 4 are always on an optical path.

Figure 3:
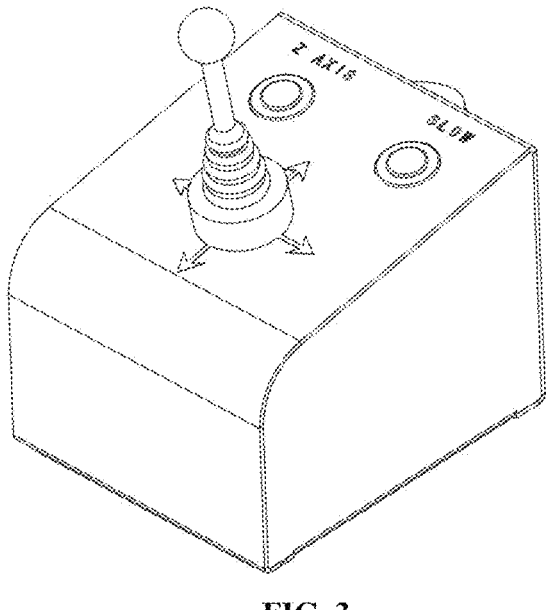
FIG. 3 is a schematic diagram of an operation rocker for controlling a moving module in an embodiment of the present disclosure.

In addition, the drive module further includes an operation rocker, and the operation rocker drives the moving module to move up and down freely by controlling the motor. Therefore, the moving module may be controlled manually or electrically. When the moving module is controlled manually, the motor is controlled by using the operation rocker (shown in FIG. 3) so as to drive the moving module to move up and down freely. When the moving module is controlled electrically, the motor is connected to a computer controller, and then controls the motor by using an upper computer software so as to drive the moving module to move up and down freely.

In other embodiments, a motor-driven moving pair structure may also be used to implement up-and-down movement of the infrared camera module 5. The moving pair structure may be implemented by using an electric guide rail, where the infrared camera module 5 is fastened to a sliding block, and the sliding block slides on the guide rail.

In the present disclosure, a position of the infrared camera module 5 is adjusted by using the drive module, so that the measured material is located on a focal length of the infrared microscope objective 10, and the infrared host 9 can obtain the clear infrared image.

Further, the infrared camera module 5 includes an infrared host 9 and an infrared microscope objective 10. The infrared host is a plane array infrared detector to implement a function of imaging a surface of a measured sample, where the plane array infrared detector includes a refrigeration type detector and a non-refrigeration type detector, detection sensitivity of the refrigeration type plane array infrared detector is higher, and a proper plane array infrared detector may be specifically selected based on an actual requirement. The infrared microscope objective 10 is detachably connected to the infrared host 9. Therefore, the infrared microscope objective 10 is available in multiple types to meet different measurement requirements. The infrared host 9 and the infrared microscope objective 10 may move up and down as a whole. For example, the infrared host 9 may be fastened by using one support frame 14, and the infrared microscope objective 10 is directly connected to the infrared host 9. Therefore, the infrared host 9 is fixedly connected to the moving module 11 of the drive module by using the support frame 14, and the moving module 11 moves by dragging the support frame 14, so as to drive the infrared host 9 to move together with the infrared microscope objective 10.

Further, the modulated laser module 2 includes a laser device and a power supply. The laser device may be an MGL-F-532-SM type laser device of Changchun New Industry Optoelectronic Technology Co., Ltd. The type of laser device supports TTL modulation. That is, a TTL digital signal is added to a laser device power supply to control the laser device to drive on/off of a current by using an external signal, so as to control a laser output frequency.

The infrared host 9 is connected to the power supply, so as to generate a specific frequency relationship. When the infrared host 9 starts to collect images, the modulated laser module 2 emits the laser beam. Because the laser device supports TTL modulation, the power supply and the infrared host 9 may be connected by using a BNC connecting wire to complete transmission of a modulation signal, that is, an output frequency of the laser device is controlled by a collected image frequency of the infrared host 9. Therefore, this technology extracts phase information by analyzing a thermal wave signal, and may further calculate the thermal diffusion coefficient of the measured material by using the phase information. There is a four-fold relationship between a frequency at which the images are collected by the infrared host 9 and a frequency at which laser is emitted by the laser device, so that a phase-locked infrared thermal imaging technology can be implemented. The phase-locked technology has many thermal wave processing algorithms, such as a four-point algorithm. For example, when an infrared camera with a sampling frequency of 102.4 Hz is used, a frequency of modulated laser may be 25.6 Hz, 12.8 Hz, 6.4 Hz, 3.2 Hz, 2.56 Hz, or the like.

In this embodiment of the present disclosure, the infrared microscope objective 10 is fastened to a lens switcher. The lens switcher may be a manual push-pull lens switcher or an electric turntable lens switcher. At least one infrared microscope objective 10 is installed on the lens switcher, and the number of the infrared microscope objectives 10 may be two, three, or four or more choices. The replacement of the infrared microscope objective 10 may be completed manually or electrically. Different infrared microscope objectives 10 have different resolution and imaging magnification. If a single infrared microscope objective 10 is used, the single infrared microscope objective 10 may be directly connected to the infrared camera.

The modulated laser module 2 includes a laser device, a power supply, and a laser output coupled fiber 16, and the laser output coupled fiber 16 is movably disposed on the base 7. As shown in FIG. 1, a bottom of the laser output coupled fiber 16 is fastened to the fastening hole 8 of the base 7 by using a fastening module, and is set in a moving manner to facilitate measurement of different samples and adjustment of a laser output angle.

Further, the vacuum sample chamber module 4 includes a vacuum chamber and a support for supporting the vacuum chamber, and the support is fastened to the base 7. The vacuum chamber is connected to a vacuum pump (not shown). The vacuum pump is configured to evacuate the vacuum chamber. For example, a vortex vacuum pump is selected. The vacuum chamber is a vacuum bellows. In a case that a pipeline installation path is short and there is no transition, a vacuum rigid pipe may be selected.

The support is erected on an outer side of the beam shaping and focusing module 3. As shown in FIG. 1, the vacuum chamber is located directly above the beam shaping and focusing module 3. The laser beam enters the vacuum chamber by using the beam shaping and focusing module 3. A quartz glass lens is disposed on one side of the vacuum chamber facing the beam shaping and focusing module 3, and the quartz glass lens enables the laser to hit a back side of the measured sample. A germanium glass lens is covered above the vacuum chamber, and infrared light can transmit through the germanium glass lens, so that the infrared camera can image a front face of the measured sample.

Figure 4:
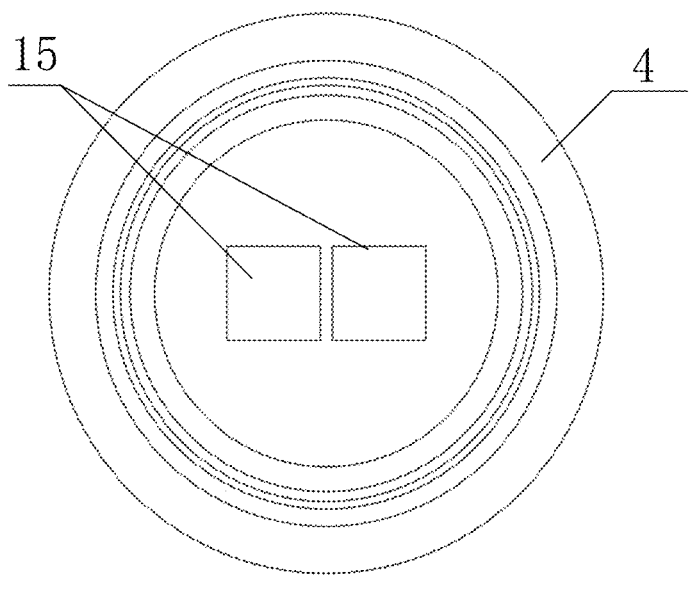
FIG. 4 is a structure diagram of a vacuum sample chamber module in an embodiment of the present disclosure.

Optionally, as shown in FIG. 4, a plurality of sample holders 15 are disposed in the vacuum chamber, and the plurality of sample holders 15 are configured to place the materials of different shapes. A plurality of sample holders 15 for placing samples are disposed in the sample chamber, which may implement a function of measuring a plurality of samples at one time. The plurality of sample holders 15 facilitate placement of samples of different shapes. When multiple-hole sample holders are used, a distribution image of thermal diffusion coefficients of a plurality of samples can be obtained only by one sampling. In the embodiment of the present disclosure, there are at least two sample holders 15.

Further, the sample holders include single-hole sample holders or multiple-hole sample holders of different sizes. The sample holders may include sample holders applicable to a high temperature environment. A feature of this type of sample holder is that a thermal insulation material is used as a support base. The other type is sample holders applicable to a room temperature environment. The sample holders optionally include a single-hole type and a multiple-hole type, and have holes of different shapes and sizes to implement a thermal diffusion coefficient measurement function of a single sample, multiple samples, and a sample of any shape.

The sample holder is made of a thermal insulation material and used for a high temperature environment, or the sample holder is made of a metal material and used for a room temperature environment. For example, a thermal insulation material such as a thermal insulation ceramic or calcium silicate can be used in a high temperature environment of 150° C. to 500° C. Metal materials such as copper and aluminum alloys can be used in a room temperature range from −20° C. to 150° C. Optionally, hole sizes of the sample holders are (length×width): 5 mm×5 mm, 10 mm×10 mm, 20 mm×20 mm, and the like.

The beam shaping and focusing module 3 includes a beam expander, a right-angle reflecting prism 19, and a convex lens 18, where the convex lens 18 is movably disposed above the beam expander and the right-angle reflecting prism 19. The beam expander and the right-angle reflecting prism 19 are fastened to an optical platform (the optical platform is fastened to the base 7) at a bottom, and serve as a beam expanding and reflecting path, and the convex lens 18 is used for focusing.

Figure 5:
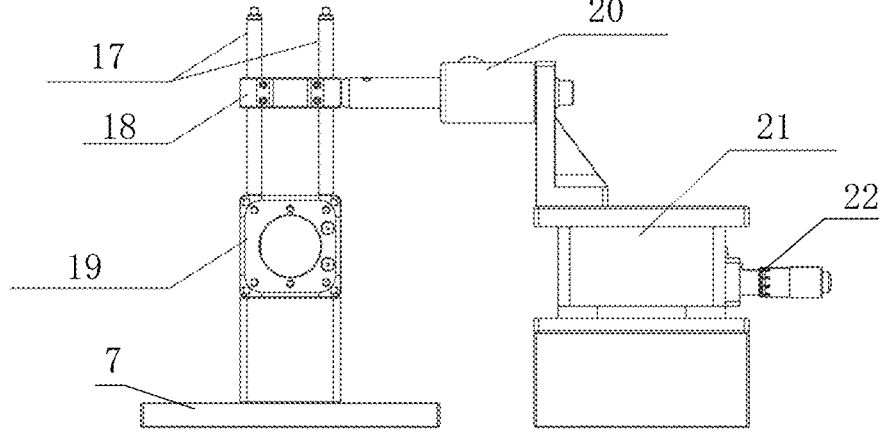
FIG. 5 is a structure diagram of a beam shaping and focusing module in an embodiment of the present disclosure.

In some embodiments, as shown in FIG. 5, the convex lens 18 is connected to the right-angle reflecting prism 19 and the beam expander (not shown) on a same optical path by using a coaxial connecting rod 17. The coaxial connecting rod 17 may be disposed as four columns, and the convex lens 18 may slide up and down over the four columns. The beam shaping and focusing module 3 further includes an optical connecting rod 20 fixedly connected to the convex lens 18, and a Z-axis displacement table 21. The Z-axis displacement table 21 is located on the right of the optical connecting rod 20. The Z-axis displacement table 21 is connected to the convex lens 18 by using the optical connecting rod 20. The Z-axis displacement table 21 is fastened to the base 7. Up-and-down adjustment for the position of the optical connecting rod 20 is implemented by using an adjusting knob 22 on a lower right side of the Z-axis displacement table 21, so as to ensure that a spot when the beam is shot on the back of the measured material is a focused spot. Z axis is a height direction, and the Z-axis displacement table 21 may be a displacement table in a known height direction. A specific structure of the Z-axis displacement table 21 is not described again.

Furthermore, the apparatus for measuring a thermal diffusion coefficient of a material further includes an analysis module 6. The infrared camera module 5 includes an infrared host 9. The analysis module 6 is connected to the infrared host 9. The analysis module 6 is configured to receive and process the thermal sequence images. The analysis module 6 calculates the thermal diffusion coefficient of the material based on the thermal sequence images. A known one-dimensional or multi-dimensional thermal wave method may be used to solve a solution in a calculation process. Details are not described again.

In addition, a fastened frame 1 is further disposed on an outer side of the apparatus for measuring a thermal diffusion coefficient of a material, so as to play a protective role.

In the present disclosure, the drive module is configured to drive the infrared camera module to move up and down freely to facilitate to complete focusing, the infrared camera module that can move up and down freely may collect a surface image of a material in the vacuum sample chamber module, and a distribution image of a thermal diffusion coefficient on a surface of a sample may be obtained by means of one measurement, which is beneficial to evaluate material defects and uniformity. The lens switcher may use different infrared microscope objectives, and the infrared camera module drives the infrared microscope objectives to adapt to different focal lengths of the objectives, so as to implement multi-location detection. In addition, image collection may be performed on a plurality of measured materials.

It should be understood that, in addition to measuring a thin-film material, the apparatus for measuring a thermal diffusion coefficient of a material provided in the present disclosure is also applicable to a block-like material, a powder-like material, a laminate plate, a paste, and other types of materials. A sample chamber of a corresponding material may be selected for measurement.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An apparatus for measuring a thermal diffusion coefficient of a material, comprising a base, and a modulated laser module, a beam shaping and focusing module, and a drive module that are fastened to the base, a vacuum sample chamber module containing the material being disposed above the beam shaping and focusing module, and an infrared camera module that is able to move up and down freely being disposed above the vacuum sample chamber module, wherein the drive module is configured to drive the infrared camera module to move up and down freely; and the modulated laser module emits a laser beam to the beam shaping and focusing module, the beam shaping and focusing module guides the laser beam into the vacuum sample chamber module to irradiate the material, and the infrared camera module collects thermal sequence images after the material is heated by the guided laser beam.

2. The apparatus for measuring a thermal diffusion coefficient of a material according to claim 1, wherein the modulated laser module comprises a laser device, a power supply, and a laser output coupled fiber, and the laser output coupled fiber is movably disposed on the base.

3. The apparatus for measuring a thermal diffusion coefficient of a material according to claim 1, wherein the beam shaping and focusing module comprises a beam expander, a right-angle reflecting prism, and a convex lens, and the convex lens is movably disposed above the beam expander and the right-angle reflecting prism.

4. The apparatus for measuring a thermal diffusion coefficient of a material according to claim 3, wherein the beam shaping and focusing module further comprises an optical connecting rod fixedly connected to the convex lens, and a Z-axis displacement table, and the Z-axis displacement table is connected to the convex lens by using the optical connecting rod; and the convex lens is connected to the right-angle reflecting prism in a same optical path by using a coaxial connecting rod.

5. The apparatus for measuring a thermal diffusion coefficient of a material according to claim 1, further comprising an analysis module, wherein the infrared camera module comprises an infrared host, the analysis module is connected to the infrared host, and the analysis module is configured to calculate the thermal diffusion coefficient of the material based on the thermal sequence images.

6. The apparatus for measuring a thermal diffusion coefficient of a material according to claim 5, wherein the infrared host is a plane array infrared detector.

7. The apparatus for measuring a thermal diffusion coefficient of a material according to claim 1, wherein the infrared camera module comprises an infrared host and an infrared microscope objective, the infrared microscope objective is detachably connected to the infrared host, and the infrared host is fixedly connected to the drive module by using a support frame.

8. The apparatus for measuring a thermal diffusion coefficient of a material according to claim 7, wherein the infrared microscope objective comprises a lens switcher; and at least one infrared microscope objective is installed on the lens switcher.

9. The apparatus for measuring a thermal diffusion coefficient of a material according to claim 8, wherein the modulated laser module comprises a laser and a power supply, and the infrared host is connected to the power supply.

10. The apparatus for measuring a thermal diffusion coefficient of a material according to claim 1, wherein the drive module comprises a motor and a moving module, and the motor drives the moving module so as to drive the infrared camera module to move up and down freely along a fixed route.

11. The apparatus for measuring a thermal diffusion coefficient of a material according to claim 10, wherein the moving module comprises a drag chain and a sliding rail, the drag chain is connected to an upper part of the infrared camera module, and the sliding rail is configured to guide the infrared camera module.

12. The apparatus for measuring a thermal diffusion coefficient of a material according to claim 10, wherein the drive module further comprises an operation rocker, and the operation rocker drives the moving module to move up and down freely by controlling the motor.

13. The apparatus for measuring a thermal diffusion coefficient of a material according to claim 1, wherein the vacuum sample chamber module comprises a vacuum chamber and a support for supporting the vacuum chamber, the vacuum chamber is connected to a vacuum pump, the vacuum pump is configured to evacuate the vacuum chamber, and the support is erected on an outer side of the beam shaping and focusing module.

14. The apparatus for measuring a thermal diffusion coefficient of a material according to claim 13, wherein a germanium glass lens is covered above the vacuum chamber, and a quartz glass lens is disposed on a surface of the vacuum chamber facing the beam shaping and focusing module; and the vacuum chamber is a vacuum bellows.

15. The apparatus for measuring a thermal diffusion coefficient of a material according to claim 13, wherein a plurality of sample holders are disposed in the vacuum chamber; and the sample holders comprise single-hole sample holders or multiple-hole sample holders of different sizes.

16. The apparatus for measuring a thermal diffusion coefficient of a material according to claim 15, wherein the sample holders are made of a thermal insulation material and used for a high temperature environment, or the sample holders are made of a metal material and used for a room temperature environment.

\* \* \* \* \*